US008746101B2

(12) United States Patent
Hausladen et al.

(10) Patent No.: US 8,746,101 B2
(45) Date of Patent: Jun. 10, 2014

(54) DRIVE UNIT WITH OVERLOAD PROTECTION FOR DRIVING A RING GEAR

(75) Inventors: Norbert Hausladen, Biberach (DE); Matthias Sedlmaier, Mittelbiberach (DE)

(73) Assignee: Liebherr-Components Biberach GmbH, Biberach/Riss (DE)

( * ) Notice: Subject to any disclaimer, the term of this patent is extended or adjusted under 35 U.S.C. 154(b) by 473 days.

(21) Appl. No.: 12/846,059

(22) Filed: Jul. 29, 2010

(65) Prior Publication Data

US 2011/0027006 A1 Feb. 3, 2011

(30) Foreign Application Priority Data

Jul. 29, 2009 (DE) .......................... 10 2009 035 197

(51) Int. Cl.
| F16D 9/06 | (2006.01) |
| F16D 9/08 | (2006.01) |
| F16D 7/02 | (2006.01) |
| F16D 7/04 | (2006.01) |
| F16H 35/10 | (2006.01) |

(52) U.S. Cl.
USPC .......... 74/421 A; 74/412 TA; 464/32; 464/33; 464/42; 192/150

(58) Field of Classification Search
USPC ...... 74/412 TA, 421 A, 665 P, 665 E; 464/32, 464/34, 36
See application file for complete search history.

(56) References Cited

U.S. PATENT DOCUMENTS

| 2,585,113 A | 2/1952 | Gredell |
| 2,773,369 A | 12/1956 | Klemm |
| 3,038,576 A | 6/1962 | Simpson |
| 3,200,616 A | 8/1965 | Hawkins |
| 4,528,470 A | 7/1985 | Young et al. |
| 6,035,736 A | 3/2000 | Gyllner et al. |
| 6,389,917 B1 * | 5/2002 | Oberle ...................... 74/412 TA |
| 6,533,093 B2 * | 3/2003 | Chen .......................... 192/56.62 |
| 2003/0160456 A1 | 8/2003 | Alloys |
| 2008/0276734 A1 | 11/2008 | Fulton |
| 2011/0237386 A1 * | 9/2011 | Hirtt et al. .......................... 477/3 |

FOREIGN PATENT DOCUMENTS

| CH | 284877 | 8/1952 |
| DE | 1067694 | 10/1959 |
| DE | 1133325 | 7/1962 |
| DE | 1931657 U | 1/1966 |
| DE | 3912432 | 11/1989 |
| DE | 19500078 | 7/1996 |
| DE | 19754260 | 6/1999 |
| DE | 19920504 | 6/2000 |
| DE | 10015093 | 10/2001 |

(Continued)

OTHER PUBLICATIONS

Antriebstechnik, KEM Sonderheft S1, Jun. 2009, pp. 40-41.

(Continued)

*Primary Examiner* — Richard M. Lorence
*Assistant Examiner* — Lillian Nguyen
(74) *Attorney, Agent, or Firm* — Dilworth & Barrese, LLP (57) ABSTRACT

A drive unit for driving a ring gear includes a motor, a transmission and a drive shaft, on which a pinion is arranged for driving the ring gear, wherein the drive unit includes a mechanical overload protection. In accordance with the invention the overload protection is arranged between the transmission and the pinion.

23 Claims, 5 Drawing Sheets (56) References Cited

FOREIGN PATENT DOCUMENTS

| DE | 10307929 | 9/2004 |
|----|----------|--------|
| DE | 102006035712 | 2/2008 |
| EP | 1409 | 4/1979 |
| EP | 1635057 | 3/2006 |
| JP | 2004-232500 | 8/2004 |

OTHER PUBLICATIONS

"Planetengetriebe mit Überlastrutsch-Kupplung," Produktmeldung Jun. 23, 2006, KEM-Konradin Verlag.
Impulse Jan. 2009, VEM-Group, pp. 1-4.

* cited by examiner

Fig. 8

DRIVE UNIT WITH OVERLOAD PROTECTION FOR DRIVING A RING GEAR

BACKGROUND OF THE INVENTION

The present invention relates to a drive unit for driving or braking a ring gear, comprising a motor or a brake, a transmission and an output shaft on which a pinion is arranged for driving the ring gear.

Such drive units are used for example for driving slewing or swing gears, in particular for driving a slewing gear of a wind turbine or for driving a slewing or swing gear of a crane or an excavator. The ring gear has teeth on its outer circumference or inner circumference, which mesh with the teeth of the pinion. By driving the pinion via the output shaft, the ring gear thus can be driven. Ring gears are also used for driving winches, in particular for driving winches of a crane.

For driving a ring gear, a plurality of drive units can also be used in parallel, when great drive forces are required.

For such drive units, overload protection devices, e.g. in the form of slip clutches or predetermined breaking points, are known already, which are arranged between the motor and the transmission. In this way, the torque flow running from the drive motor in the direction of the output shaft or the torque flow from the transmission back to the motor is limited.

SUMMARY OF THE INVENTION

With known drive units, however, an optimum overload protection cannot be guaranteed. Therefore, it is the object of the present invention to provide a drive unit for driving a ring gear with an improved overload protection.

In accordance with the invention, this object is solved by a drive unit according to the description herein. The inventive drive unit for driving a ring gear includes a motor, a transmission and a drive shaft, on which a pinion is arranged for driving the ring gear. In accordance with the invention, the drive unit includes a mechanical overload protection, which is arranged between the transmission and the pinion.

Due to the inventive arrangement of the overload protection between the transmission and the pinion, a torque flow from the output shaft to the drive motor can still be monitored, even if the transmission is blocked. The overload protection in accordance with the invention thus provides for protecting the teeth of the ring gear or the pinion against a tooth overload fracture in the case of the failure of the transmission. The overload protection is disposed behind all transmission components, so that in the case of a blockage of the transmission the overload protection ensures that with a torque flow from the ring gear to the pinion the teeth can be protected against tooth overload fracture. Known drive units cannot offer such protection of the teeth of the ring gear, so that enormous capital damages can occur as a result of tooth fracture damages.

The overload protection is arranged after all elements of the transmission liable to failure, such as gear wheels, planetary bolts or locking rings. This involves the further advantage that the transmission components can be dimensioned smaller, because they no longer can lead to a total wreckage of the plant. In addition, quality assurance monitoring at the components located before the overload protection and during the corresponding assembly operations can be reduced, because the same no longer can lead to a main damage on the ring gear.

Advantageously, the overload protection is arranged between the transmission and the main bearing of the output shaft. As a result, the overload protection is located at a point where only one type of load is present. In particular, there is a pure torsional load, so that bending loads cannot influence the result. This provides for a precisely defined overload protection. In addition, the arrangement of the overload protection between the transmission and the main bearing of the output shaft ensures that the output shaft remains mounted in the bearing even upon activation of the overload protection and therefore cannot damage any further components.

Advantageously, the overload protection is configured as predetermined breaking point. Such predetermined breaking point provides for an extremely inexpensive overload protection. The predetermined breaking point is destroyed upon activation of the overload protection. The capital damage, however, is relatively small, since the ring gear itself is not damaged. In addition, the drive unit in any case must be replaced or repaired in the case of a blockage of the transmission.

Advantageously, the overload protection is a predetermined breaking point of the output shaft. This provides for a both space-saving and inexpensive realization of the overload protection. Advantageously, the predetermined breaking point is arranged in the output shaft between the transmission and the main bearing of the output shaft.

Advantageously, the predetermined breaking point is realized by a reduction in cross-section of a shaft. Such reduction in cross-section allows a simple and inexpensive realization of an overload protection. Due to the inventive arrangement of the overload protection, the predetermined breaking point is only loaded in one way, e.g. by a pure torsional load, so that a defined overload protection nevertheless is possible.

Due to the inventive arrangement of the overload protection, the cross-section approximately has constant stresses. The moment of resistance at said reduced cross-section is freely selectable and can easily be optimized in the ratio of yield onset to fracture onset.

Advantageously, the predetermined breaking point is realized by a reduction in cross-section of the output shaft. Advantageously, the reduction in cross-section is arranged between the last transmission component and the main bearing of the output shaft.

Advantageously, the shaft has a notch in the outer circumference in the region of the predetermined breaking point. By means of such notch, a defined reduction in cross-section can be realized. A desired notch factor to achieve a necessary fatigue strength can be obtained by mounting radii.

Furthermore advantageously, the shaft is drilled hollow in the region of the predetermined breaking point. As a result, a torsional fracture at the predetermined breaking point does not lead to the two parts being spread apart, because the cross-section drilled hollow is plasticized at the predetermined breaking point in the case of a torsional fracture.

In the region of the predetermined breaking point, the shaft can be both case-hardened and soft. It must only be ensured that the fracture protection of the overload protection is smaller than the fracture safety of the tooth to be protected.

Advantageously, however, the shaft is not surface-hardened at least in the region of the predetermined breaking point. By constructing the shaft soft, a simpler design of the predetermined breaking point is made possible. The missing hardness of the edge layer makes design easier, since the scatter range of the material strength values is smaller. Thus, the design can more exactly be adjusted to a certain torque.

As an alternative to a tapered cross-section of a shaft, the predetermined breaking point can also be realized by shear pins.

Alternatively, the overload protection can also be realized as a slip or disengaging clutch. Such configurations have the advantage that the components of the drive like the output shaft are not destroyed. However, such configurations also are much more expensive.

In accordance with the invention, the overload threshold of the overload protection, in particular the fracture threshold of the predetermined breaking point, advantageously is smaller than the fracture threshold of the teeth of the pinion and/or the teeth of the ring gear. This ensures that the overload protection responds in the case of a blockage of the transmission, before an overload fracture of the teeth of the pinion and/or of the teeth of the ring gear occurs.

The drive unit of the invention furthermore advantageously includes a common housing for the transmission, the overload protection and the main bearing of the output shaft. In particular, both the transmission and the output shaft are mounted at the common housing. The overload protection thus can be arranged in the common housing between the transmission and the main bearing.

Advantageously, the housing is configured oil-tight. Due to the inventive arrangement of the overload protection, the housing remains oil-tight even upon activation of the overload protection, in particular in the case of a fracture of the predetermined breaking point, because the seals of the housing are not impaired by an activation of the overload protection. In particular, an oil seal is arranged in the region of the main bearing of the output shaft.

The present invention furthermore comprises a set of two or more drive units as shown above for the common drive of a ring gear. The overload protections of the invention ensure that in the case of a blockage of one of the drive units the teeth of the ring gear are not damaged by the force of the other drives or by external loads. Upon occurrence of an overload, e.g. by blockage of the transmission of a drive unit, the defective drive unit releases the ring gear upon activation of the overload protection, but there still exists a further drive unit which provides for a drive of the ring gear or a protection against uncontrolled movements.

The present invention furthermore comprises a device with a ring gear which is driven by at least one drive unit in accordance with the invention. Furthermore, the present invention comprises a device with a ring gear which is driven by at least two drive units as shown above. This involves the same advantages as already set forth above.

In particular, the ring gear can be part of a slewing or swing gear by means of which an assembly of the device can be rotated or swiveled with respect to another assembly. In particular, this is the ring gear of a slewing gear of a wind turbine, by which the nacelle or the blade can be rotated about a vertical axis of rotation.

Furthermore, the present invention can be used in a working machine, in particular in a mobile working machine. For example, this can be the slewing gear of a crane or excavator, by which a tower or an uppercarriage can be rotated.

In particular, the present invention advantageously is used in such slewing or swing gears which are driven by two or more drive units.

The ring gear likewise can serve for driving a winch. In particular, in winches with external ring gear, which are driven by one or more drive units, the ring gear thus can be protected against tooth fracture. Here as well, the drive units of the invention advantageously are used when two or more drive units together are employed for driving a ring gear.

BRIEF DESCRIPTION OF THE DRAWINGS

The present invention will now be explained in detail with reference to embodiments and drawings, in which.

DESCRIPTION OF THE PREFERRED EMBODIMENTS

Figure 1:
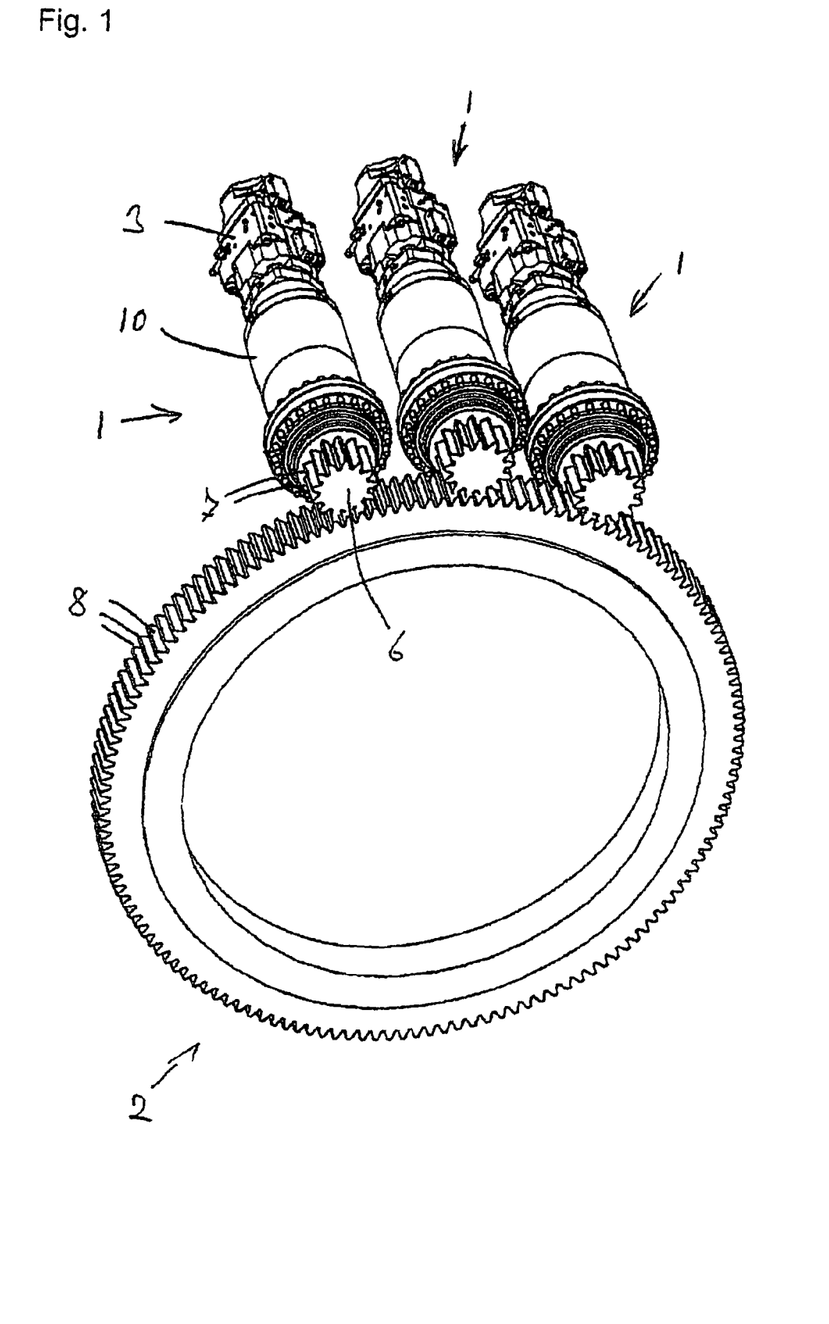
FIG. 1: shows a first embodiment of a device in accordance with the invention with a ring gear and a plurality of drive units of the invention for driving a ring gear.

FIG. 1 shows an embodiment of a device in accordance with the invention. There is provided a plurality of drive units 1 in accordance with the invention, which together drive a ring gear 2. Each of the drive units 1 includes a motor 3, in this embodiment a hydraulic motor. Alternatively, other motors, in particular electric motors, might also be used. Each of the drive units furthermore includes a transmission and an output shaft, which are mounted in the common housing 10. On the output shaft a pinion 6 each is arranged, which meshes with the ring gear 2. The teeth 7 of the pinions 6 are in connection with the teeth 8 of the ring gear. The drive units 1 can be mounted on the device via a mounting flange. The ring gear 2 is of ring-shaped design and includes teeth 8 on its outside. The ring gear also can include an internal toothing.

In the embodiment shown in FIG. 1, three drive units are provided for the ring gear 2. Alternatively, however, only one or two drive units might also be used. The use of more than three drive units likewise is conceivable. In wind turbines, for example, embodiments are known in which eight and more drive units are used.

The device in accordance with the invention in particular can be a wind turbine, wherein the ring gear 2 serves for rotating the nacelle about a vertical axis of rotation. The ring gear 2 can also be part of a slewing or swing gear of a working machine, in particular of a crane or excavator. For example, it can be the slewing ring with which the uppercarriage of a crane or excavator can be rotated with respect to the undercarriage. It can also be the slewing ring with which a boom, a tower or an uppercarriage of a crane can be rotated with respect to a base. Furthermore, the ring gear 2 can also serve for driving a winch with external drive, in particular a cable winch of a crane.

In such devices, the ring gear 2 is extremely cost-intensive both in manufacture and in assembly, so that damages of the teeth 8 of the ring gear lead to high costs. In accordance with the invention, the drive units 1 therefore are equipped with an overload protection. To protect the teeth of the ring gear 8 against tooth fracture in the case of a blockage of the transmission of one of the drive units also with torque flows from the ring gear 2 to the drive unit, the overload protection is arranged between the transmission and the pinion 6. The torque strength of the overload protection therefore is smaller than the torque strength of all other elements in the force path of the drive unit and in particular smaller than the fracture safety of the teeth 7, 8 to be protected.

In the case of a blockage of the transmission and an overload in the torque flow from the ring gear 2 to the drive unit, the overload protection thus is activated and protects the teeth of the ring gear 8 against tooth overload fracture. Such torque flows from the ring gear 2 to the drive unit can occur in particular when external forces, such as wind forces or load forces, act on the ring gear or when one of several drive units blocks and the remaining ones still transmit torque.

In particular, the overload protection is arranged after all elements of the transmission liable to failure, such as gear wheels, planetary bolts or locking rings. Thus, the transmission components located before the overload protection can be dimensioned smaller, which leads to a saving of costs. This smaller dimensioning of the transmission components is possible, since their failure no longer can lead to a total wreckage of the plant. In addition, the quality assurance monitoring at the transmission components and at all components located before the overload protection and during the corresponding mounting operations can be reduced, since a failure in this region no longer can lead to a main damage.

FIGS. 2 to 8 now show different embodiments of the drive unit in accordance with the invention. All embodiments include a motor 3 as well as a transmission 4 which is driven by the motor 3. The motor 3 and the transmission 4 each are shown only schematically. The transmission 4 in turn drives an output shaft 5 on which the pinion 6 is arranged. The output shaft 5 is mounted in a main bearing 9 which in this embodiment consists of two bearings, in particular of two ball or roller bearings. The overload protection is arranged between the last transmission element 14 and the main bearing 9 of the output shaft.

Due to the arrangement between transmission and main bearing of the output shaft, the overload protection is located at a point at which a pure torsional load exists. In this way, bending loads cannot influence the result, so that a clear torque limit can be adjusted. In addition, the transmission remains oil-tight despite an activation of the overload protection, because the seal is not impaired by e.g. a fracture of the predetermined breaking point.

The transmission 4 includes a housing 10 on which the output shaft 5 also is supported via the main bearing 9. For this purpose, bearing elements 12 are provided, on which the bearings of the main bearing 9 are arranged. The overload protection thus is located between transmission and main bearing 9 in the interior of the housing 10. The oil seal 13 is arranged in the region of the main bearing, in this embodiment between the two bearings of the main bearing.

Figure 2:
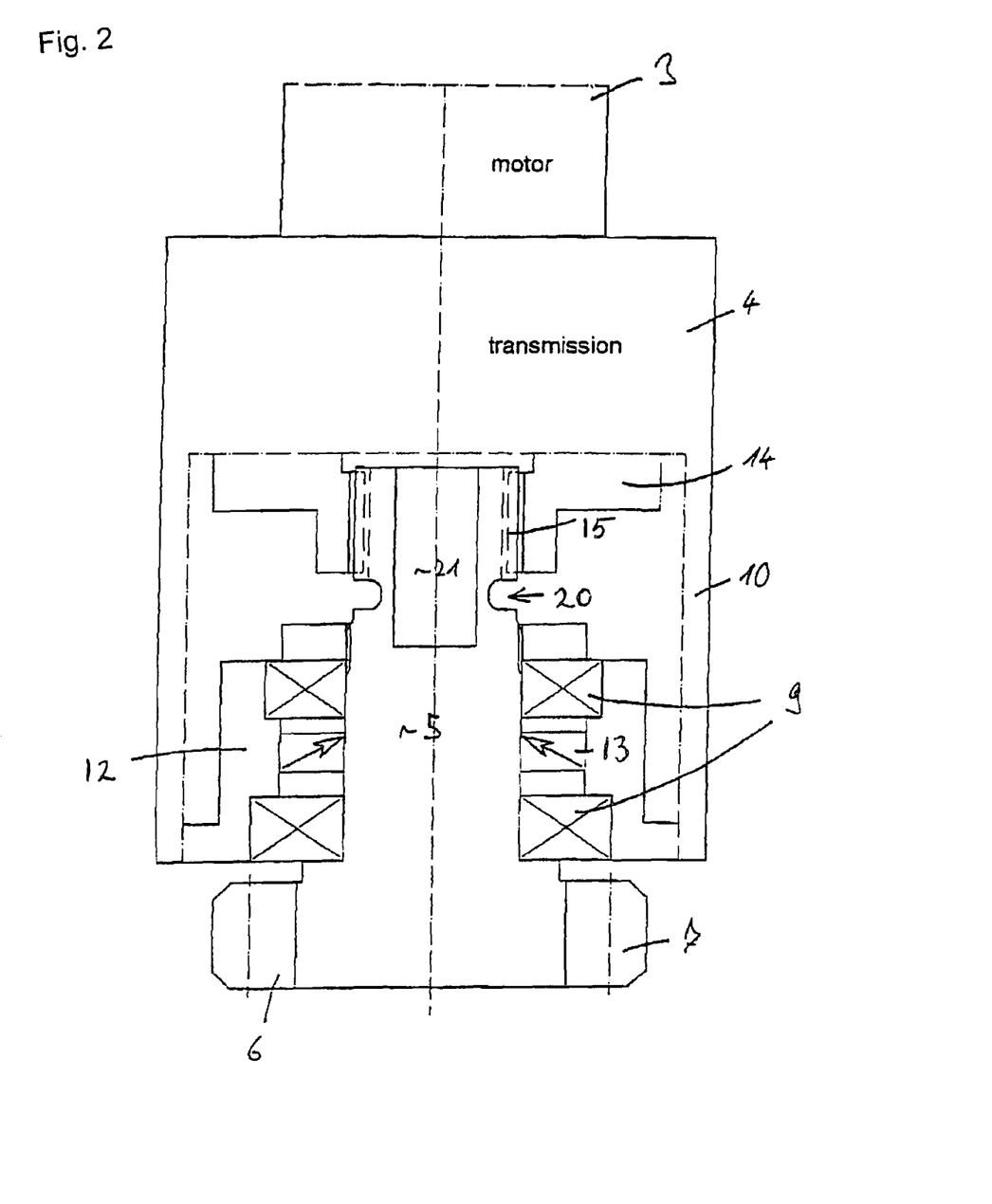
FIG. 2: shows a sectional view through a first embodiment of a drive unit in accordance with the invention.

In FIG. 2 now a first embodiment is shown, in which the overload protection is realized by a predetermined breaking point 20. The predetermined breaking point 20 is integrated in the output shaft 5 and arranged between the connecting region 15 with the last transmission element 14 of the transmission and a bearing region of the main bearing 9 on the output shaft 5. The predetermined breaking point 20 is realized as a reduction in cross-section of the output shaft 5. For this purpose, a notch is provided at the outer circumference of the output shaft 5, by which a reduced cross-section of the output shaft 5 is defined. In addition, the output shaft 5 includes an axially extending bore 21 in the region of the notch 20.

The output shaft 5 is designed soft, because the missing hardness of the edge layer makes the design simpler and the scatter range of the material strength values is smaller. As a result, the design can exactly be adjusted to a torque. Alternatively, however, a case-hardened configuration of the output shaft 5 would also be possible. It must merely be ensured that the fracture threshold of the predetermined breaking point 20 is smaller than the fracture safety of the teeth 7, 8 to be protected.

The reduced cross-section of the shaft has approximately constant stresses, so that a defined fracture threshold can easily be adjusted. The moment of resistance is freely selectable and can easily be optimized in the ratio of yield onset to fracture onset. A desired notch factor to achieve a necessary fatigue strength can be obtained by mounting radii. Since the shaft is drilled hollow in the region of the predetermined breaking point, a possible torsional fracture does not lead to the two parts being spread apart, since the cross-section is completely plasticized.

In FIGS. 3 to 8 further embodiments of an overload protection in accordance with the invention are shown, which likewise is arranged after all transmission components and before the main bearing of the output shaft and therefore secures the ring gear in the case of a blockage of the transmission like in the first embodiment.

Figure 3:
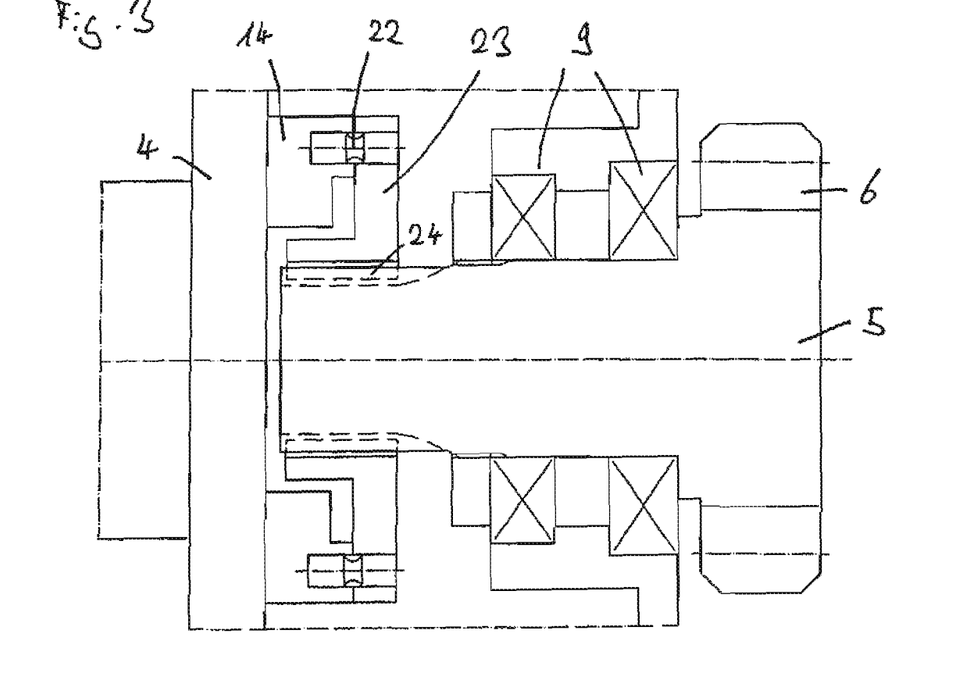
FIG. 3: shows a sectional view through a second embodiment of a drive unit in accordance with the invention.

In FIG. 3, an embodiment is shown in which the overload protection is realized by shear pins. The shear pins 22 are arranged between the last transmission-side element 14 and an element 23 on the side of the output shaft, which is non-rotatably connected with the output shaft 5 in a connecting region 24. The shear pins have defined predetermined breaking points 22.

Figure 4:
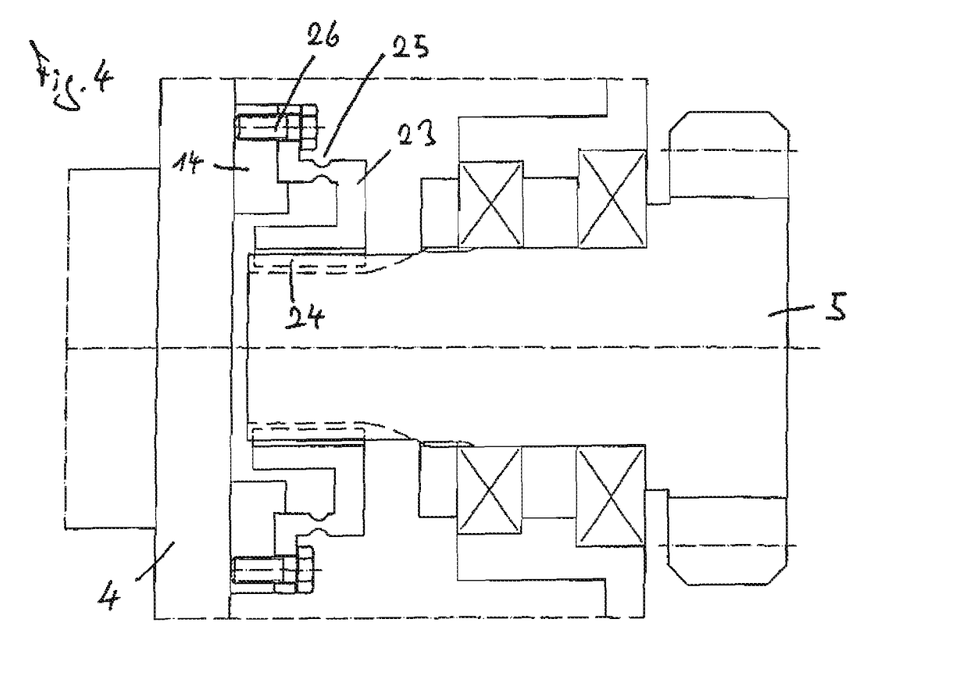
FIG. 4: shows a third embodiment of a drive unit in accordance with the invention.

In the embodiment shown in FIG. 4, the predetermined breaking point 25 is integrated in the connecting element 23, which is non-rotatably connected with the output shaft 5 in the connecting region 24. The predetermined breaking point 25 is configured as a reduction in cross-section of the connecting element 23. The connecting element 23 is connected with the last transmission-side element 14 via screw connections 26.

Figure 5:
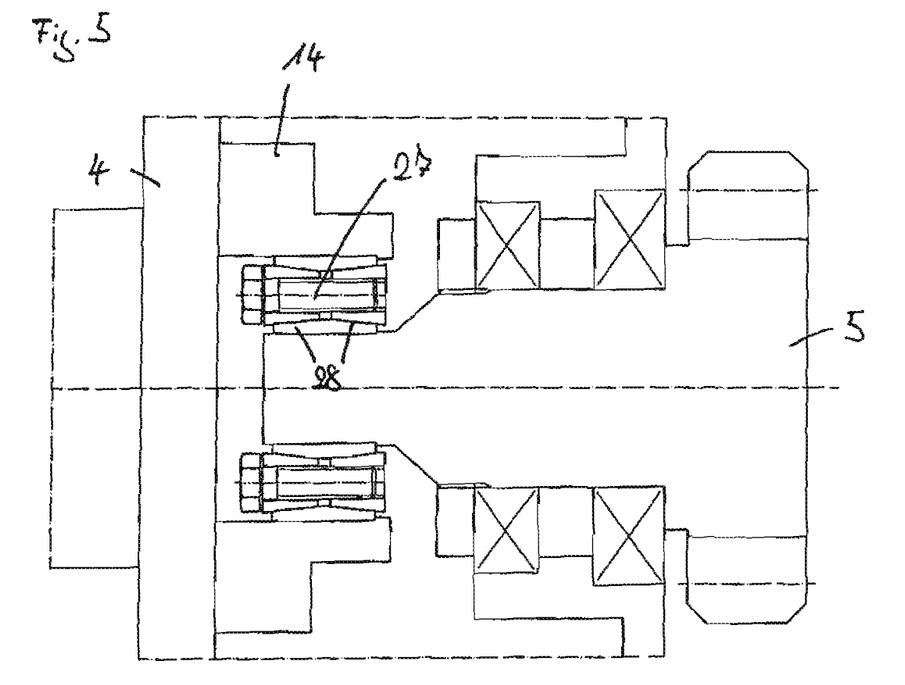
FIG. 5: shows a fourth embodiment of a drive unit in accordance with the invention.
Figure 6:
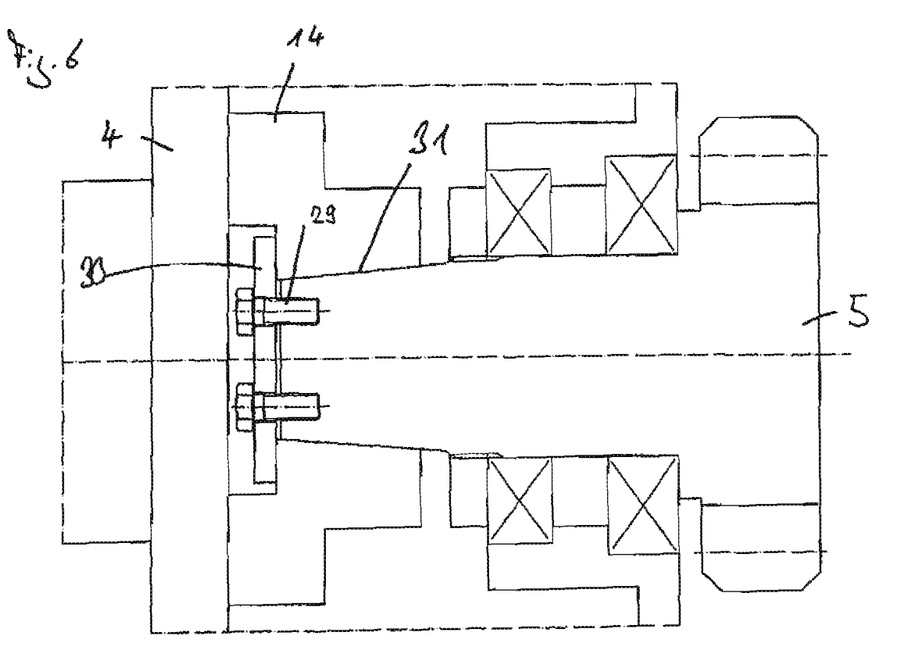
FIG. 6: shows a fifth embodiment of a drive unit in accordance with the invention.

In each of FIGS. 5 and 6, embodiments with slip clutches are shown, by which the overload protection has been realized. For this purpose, the output shaft 5 and the last transmission-side element 14 are frictionally connected with each other via a clamping device, wherein as a result of the frictional connection the connection has a load limit, upon exceedance of which the clamping device is released.

In the embodiment shown in FIG. 5, a clamping screw 27 is provided, by which clamping elements with conical cross-section are pressed into a corresponding clamping groove 28 arranged between the output shaft 5 and the last transmission-side element 14. The clamping elements are configured as clamping rings, which are moved towards each other by the clamping screw.

In the embodiment shown in FIG. 6, a connecting region 31 of the output shaft is configured as a cone which is pressed into a counter-cone on the last transmission-side element 14. For this purpose, screws 29 are provided, which engage the head of the output shaft 5 and urge a pressing plate 30 against a corresponding pressing surface on the last transmission side element 14.

In the overload protection devices shown in FIGS. 5 and 6, the overload protection is effected in that the respective press fits only can transmit a defined torque and form clutches when this torque is exceeded.

Figure 7:
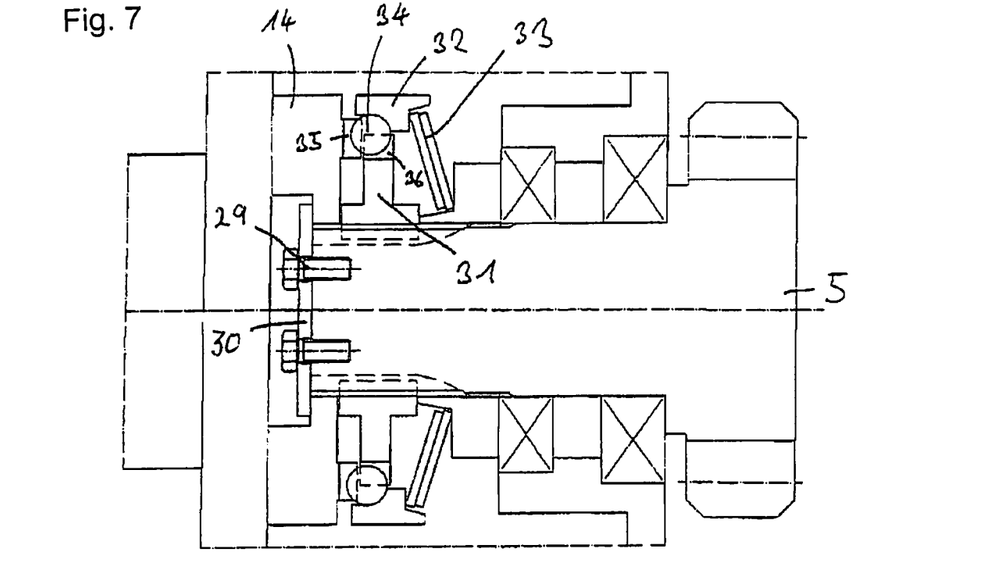
FIG. 7: shows a sixth embodiment of a drive unit in accordance with the invention.
Figure 8:
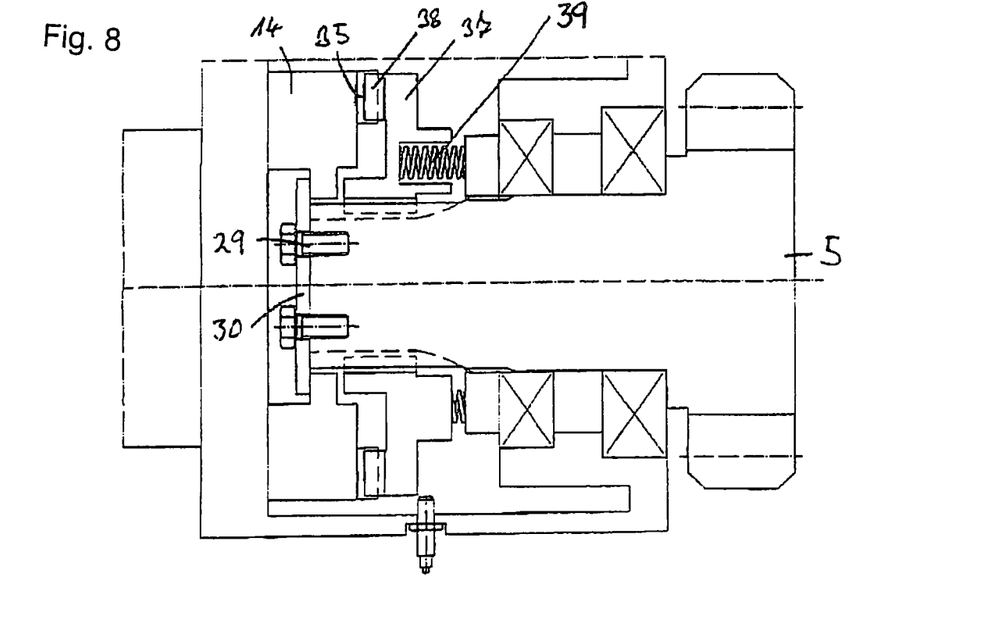
FIG. 8: shows a seventh embodiment of a drive unit in accordance with the invention.

In FIGS. 7 and 8, on the other hand, a disengaging clutch is used as overload protection. In the embodiment shown in FIG. 7, the disengaging clutch is realized by a disc spring 33, which in the coupled condition arranges balls 34 via a slidable pressure ring 32 such that the balls 34 create a positive connection between the last transmission-side element 14 and a connecting element 31, which is non-rotatably mounted on the output shaft. In the coupled condition, the balls 34 are arranged in recesses 35, 36 in the last transmission-side element 14 or in the connecting element 31.

When a defined torque is exceeded, the balls 34 are pushed out of the receptacle 35 in the last transmission-side element against the force of the disc springs 33, so that the positive connection is released. There are provided screws 29, which via a plate 30 create a non-displaceable connection between the output shaft 5 and the last transmission-side element 14 in axial direction.

In the embodiment shown in FIG. 8, on the other hand, the positive connection between the last transmission-side element 14 and the connecting element 37 on the side of the output shaft is created in that protrusions of the one element engage in receptacles of the other element. In particular, this can be realized by correspondingly meshing teeth 35 and 38.

The connecting element 37 in turn is non-rotatably coupled with the output shaft 5, but is movable in longitudinal direction and is pressed against the last transmission-side element 14 via a spring 39. When a defined torque is exceeded, the connecting element is pushed away from the last transmission-side element 14 against the force of the spring 39 and thus releases the positive connection.

Due to the inventive arrangement of the overload protection between the transmission and the main bearing of the output shaft, the present invention provides for a reliable protection of the ring gear driven by the drive unit, so that major capital damages can be avoided in the case of a blockage of the transmission.

The invention claimed is:

1. A mechanical overload protected drive unit for driving a ring gear connected to a device, comprising
   at least one motor, said motor providing a torque flow,
   at least one transmission connected to the motor, said transmission being driven by the torque flow provided by the motor, and conveying the torque flow to
   at least one output shaft connected to the transmission, said output shaft being driven by the torque flow conveyed by the transmission, and conveying the torque flow to
   at least one pinion connected to the output shaft, said pinion being driven by the torque flow conveyed by the output shaft, wherein said pinion is arranged in direct mechanical contact with the ring gear for driving the ring gear, and
   at least one mechanical overload protection device positioned between the transmission and the pinion, wherein said mechanical overload protection device is arranged to protect the teeth of the ring gear and/or the pinion from overload caused fracture.

2. The drive unit according to claim 1, wherein the overload protection device is arranged between the transmission and a main bearing of the output shaft.

3. The drive unit according to claim 2, wherein the overload protection device is configured as predetermined breaking point and advantageously as predetermined breaking point of the output shaft.

4. The drive unit according to claim 3, wherein the predetermined breaking point is realized by a reduction in cross-section of the output shaft.

5. The drive unit according to claim 4, wherein the output shaft includes a notch in an outer circumference of the output shaft in the region of the predetermined breaking point.

6. The drive unit according to claim 5, wherein the output shaft is drilled hollow in a region of the predetermined breaking point.

7. The drive unit according to claim 1, wherein the overload protection device is configured as a predetermined breaking point of the output shaft.

8. The drive unit according to claim 7, wherein the predetermined breaking point is realized by a reduction in cross-section of the output shaft.

9. The drive unit according to claim 8, wherein the output shaft includes a notch in an outer circumference of the output shaft in the region of the predetermined breaking point.

10. The drive unit according to claim 9, wherein the shaft is drilled hollow in a region of the predetermined breaking point.

11. The drive unit according to claim 8, wherein the output shaft is drilled hollow in a region of the predetermined breaking point.

12. The drive unit according to claim 7, wherein the output shaft is not surface-hardened at least in the region of the predetermined breaking point.

13. The drive unit according to claim 7, wherein the predetermined breaking point is realized by shear pins.

14. The drive unit according to claim 1, wherein the overload protection is realized as a slip or disengaging clutch.

15. The drive unit according to claim 1, wherein an overload threshold of the overload protection device is a fracture threshold of the predetermined breaking point, which is smaller than a fracture threshold of teeth of the pinion and/or teeth of the ring gear.

16. The drive unit according to claim 1, with a common housing for the transmission, the overload protection device and a main bearing of the output shaft, wherein the common housing is an oil-tight housing.

17. A mechanical overload protected device comprising a ring gear, said ring gear being driven by at least one mechanical overload protected drive unit, wherein the at least one drive unit includes
   at least one motor, said motor providing a torque flow,
   at least one transmission connected to the motor, said transmission being driven by the torque flow provided by the motor, and conveying the torque flow to
   at least one output shaft connected to the transmission, said output shaft being driven by the torque flow conveyed by the transmission, and conveying the torque flow to
   at least one pinion connected to the output shaft, said pinion being driven by the torque flow conveyed by the output shaft, wherein said pinion is arranged in direct mechanical contact with the ring gear for driving the ring gear, and
at least one mechanical overload protection device positioned between the transmission and the pinion, wherein said mechanical overload protection device is arranged to protect the teeth of the ring gear and/or the pinion from overload caused fracture.

18. A set of two or more drive units according to claim 17 for the common driving of the ring gear.

19. The device according to claim 17, wherein the ring gear is part of a slewing or swing gear of a wind turbine or a crane or excavator.

20. The device according to claim 17, wherein the ring gear serves for driving a winch.

21. The device of claim 17 comprising two or more drive units.

22. A mechanical apparatus which includes the device of claim 17.

23. The mechanical overload protected device of claim 17, wherein said device is a wind turbine, crane, excavator or winch.

\* \* \* \* \*